July 30, 1935.  P. L. FANNEN ET AL  2,009,546
LOBSTER CLAW RETAINING DEVICE
Original Filed Sept. 14, 1933
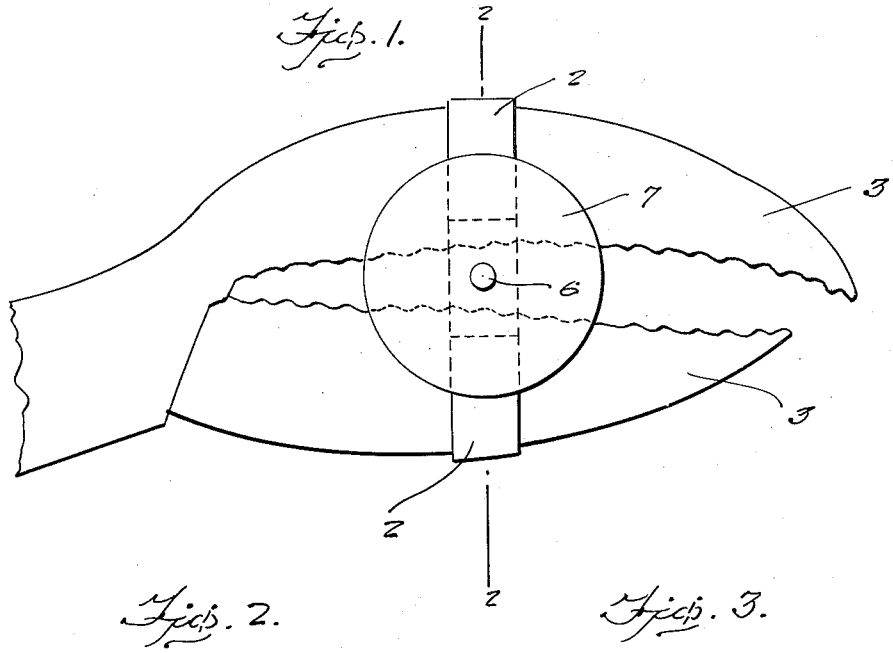
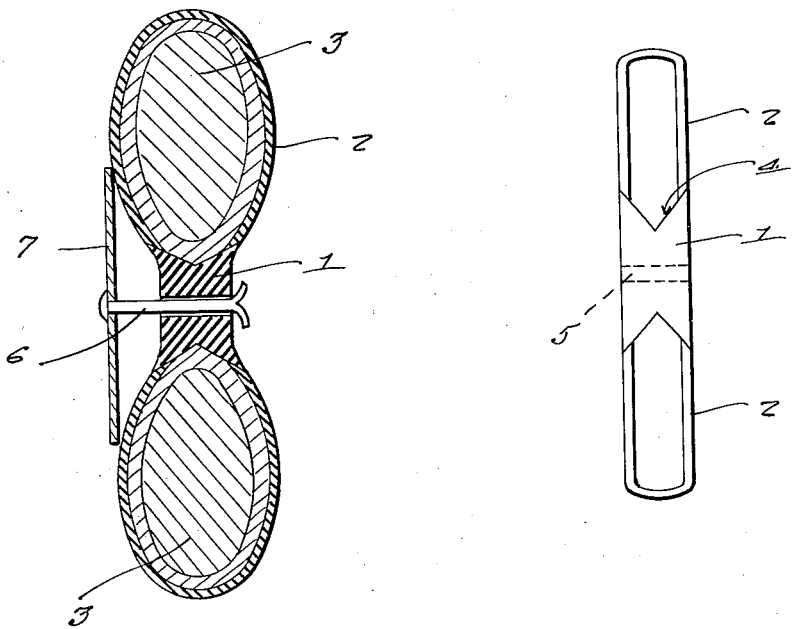
Inventors
P. L. Fannen
A. J. Cappello
By Clarence A O'Brien
Attorney Patented July 30, 1935

2,009,546

UNITED STATES PATENT OFFICE 2,009,546

LOBSTER-CLAW RETAINING DEVICE

Patrick Lawrence Fannen and Anthony Joseph Cappello, Gloucester, Mass.

Application September 14, 1933, Serial No. 689,462
Renewed April 29, 1935

2 Claims. (Cl. 17—1)

This invention relates to a device for keeping the claws of a lobster contracted without injuring the claw, the general object of the invention being to provide a band of resilient material adapted to encircle the claws with a central portion carried by the band and adapted to be placed between the claws so as to allow a small amount of movement of the claws, which eliminates paralysis of the claws.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a view of a lobster's claw, showing the invention in use.

Figure 2 is a section line 2—2 of Figure 1.

Figure 3 is an edge view of the device.

As shown in these views, the device is formed with a central part 1 and the bands 2 extended from opposite ends of the central part. This central part is preferably formed of heavy resilient material, such as rubber, and the bands are formed of elastic material, so that they can be stretched around the claws 3 of a lobster, as shown in Figure 1, with the central part 1 located between the claws, as shown in Figures 1 and 2. The ends of the central part 1 are preferably formed with V-shaped recesses 4 therein and with a transverse opening 5 so that a pin 6 may be passed through the opening 5 to support a disk 7 or the like for bearing advertising matter or the like.

Thus it will be seen that the device will hold the upper and lower parts of the claw separated and at the same time hold the claws in a contracted or semi-contracted position. The resilient center part will allow the claws to have a small amount of movement, which eliminates paralysis of the claws, as occurs when the usual wooden peg is used. The device also eliminates any bleeding or injury to the lobster or other lobsters confined with it.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A device of the class described comprising a central portion of resilient material and a pair of elastic loop forming members connected to the ends of the central member, said central member having an opening therethrough for receiving a member carrying advertising means.

2. A lobster claw retaining device of the class described comprising a central portion of resilient material and a pair of elastic loop forming members connected to the central member.

PATRICK LAWRENCE FANNEN.
ANTHONY JOSEPH CAPPELLO.